April 25, 1939. G. A. TINNERMAN 2,155,810
ATTACHING HANDLES, KNOBS, AND THE LIKE
Filed Feb. 14, 1938
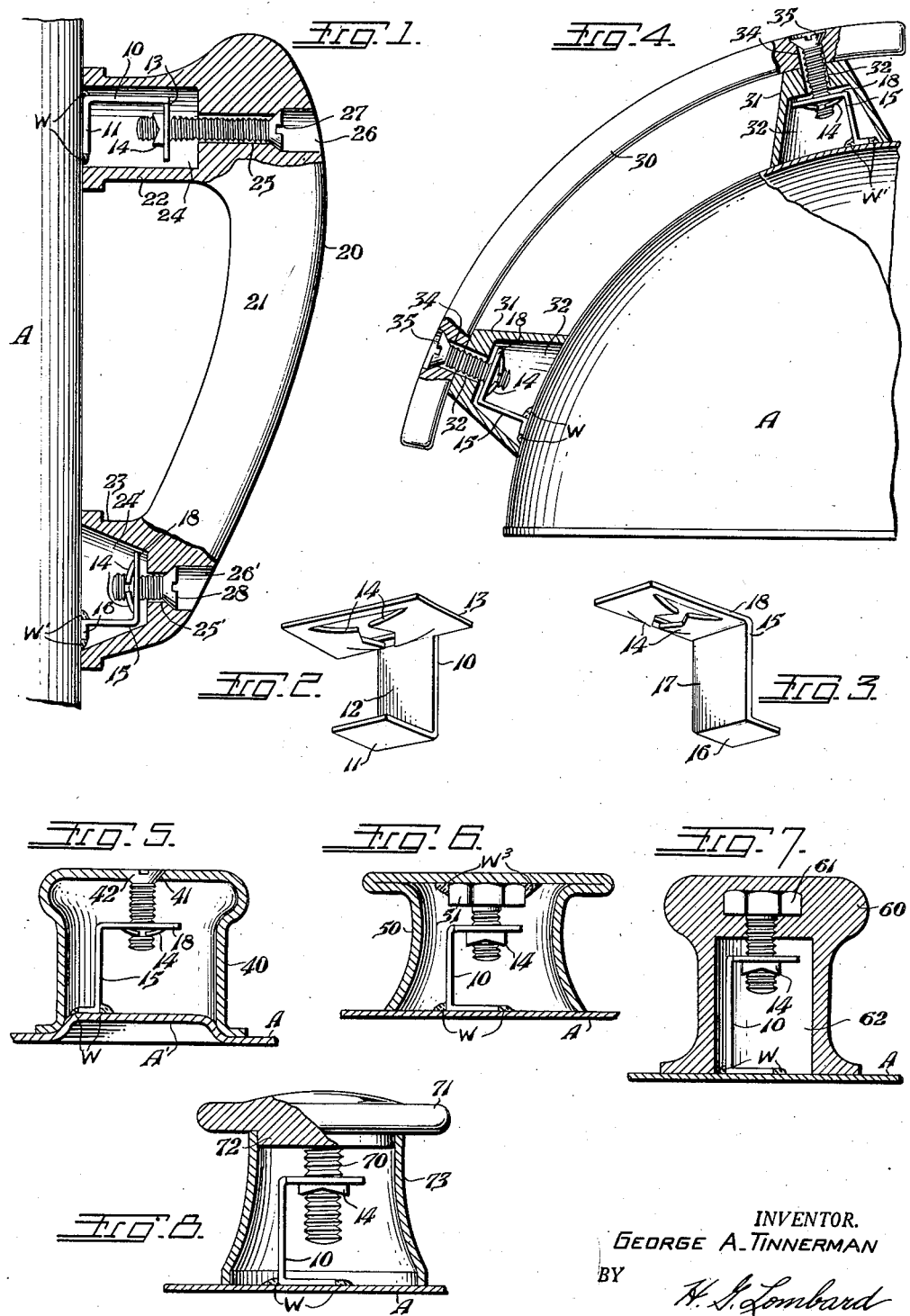
INVENTOR.
GEORGE A. TINNERMAN
BY
H. G. Lombard
ATTORNEY Patented Apr. 25, 1939

2,155,810

UNITED STATES PATENT OFFICE 2,155,810

ATTACHING HANDLES, KNOBS, AND THE LIKE

George A. Tinnerman, Rocky River, Ohio, assignor to Albert H. Tinnerman, Cleveland, Ohio Application February 14, 1938, Serial No. 190,525

9 Claims. (Cl. 16—114)

This invention relates generally to the art of attaching handles, knobs and like accessories employed in the manufacture of sheet metal ware, and is directed, more particularly, to the provision of simple, inexpensive means for mounting handles, knobs, etc., on various kitchen utensils such as percolators, coffee pots and cooking vessels.

In the manufacture of sheet metal ware, it is a common practice to mount handles, knobs, and the like, by providing openings in the sheet metal part through which fastening means, such as bolts, screws, or rivets may be passed to secure the knob or handle in mounted position. Such constructions are objectionable in the manufacture of kitchen utensils because the smooth, imperforate wall of the vessel is destroyed and leakage becomes possible in the area in which the openings for the fastenings have been provided. Also, the head of the screw or other fastening device is always exposed within the receptacle such that not only is the inner wall surface thereof broken and uneven, but under continuous, every day handling, such exposed fastening devices are subject to extraordinary wear and rough usage with the result that the knob or handle held thereby easily becomes loose and insecure in its mounting and otherwise tends to break off all too readily such that the period of effective usefulness of the vessel is unnecessarily shortened.

A further objectionable feature in this construction resides in the fact that in any use of such individual fastening devices in the manufacture of enameled sheet metal ware, due to the usual strains and bending stresses which are necessarily set up on tightening of the bolts and screws to rigidly mount the knob or handle, cracks and breaks in the enamel are inevitable with the result that portions of the enamel chip and break off and thereby cause unsightly bare spots which mar the appearance of the vessel and otherwise detract from the usefulness thereof.

In order to overcome these objectionable features, various fastening arrangements have been resorted to in providing knob and handle constructions in which the adjacent wall surface of the vessel is imperforate, even and unbroken in appearance. These constructions usually embody the attaching of a conventional threaded nut element to the outer wall surface of the vessel by one or more spot welding operations or by suitable cage devices or retainers which are likewise spot welded to the wall surface to hold the nut element in desired position for receiving bolt or screw fastenings in mounting the knob, handle or the like. Though this fastening arrangement may be employed somewhat satisfactorily in a number of applications in which cost is of no great consequence, the use thereof is prohibitive in such constructions as require a light-weight, simple, inexpensive fastening means necessitating only a minimum of time and effort in production and otherwise involve low costs of manufacture.

This may be better understood in considering the use of such knob and handle constructions embodying conventional threaded nuts as employed in the manufacture of enameled sheet metal ware in which the threaded nuts must necessarily be welded onto the sheet metal part before the application of the enamel coating to the overall surface thereof in the well known manner. The enamelling operation, of course, results in the threads of the nut also becoming coated with enamel to the extent that it is most difficult and, in some instances, impossible thereafter to thread a cooperating bolt or screw into the nut in the mounting of the knob or handle. And accordingly to overcome this tendency of the enamel to clog the threads of the nut, it has heretofore been necessary, first to assemble the bolt in the nut to protect the threads thereof during the application of the enamel, thereafter remove the bolt in assembling the knob or handle on the sheet metal part, and then again apply the bolt to the nut in completing the mounting. This procedure, all of which requires hand labor, naturally is extremely objectionable, especially from the standpoint of mass production, due to the several tedious, time consuming operations of threading the bolt into and out of engagement with the threaded nut in the manufacture of any piece of enamel ware.

It is therefore a primary object of this invention to provide a knob or handle construction which overcomes all the foregoing insufficiencies of the prior art structures and is simple, most inexpensive and easily and quickly installed in a minimum of time, effort and assembling operations.

A further object of the invention contemplates the provision of a knob or handle mounting for enameled sheet metal ware wherein the knob or handle may be rigidly attached to the sheet metal wall surface without subjecting the same to such bending stress and strain as will crack the enamel.

Another object is to provide a light weight, all sheet metal knob or handle mounting for a sheet metal part without perforating the same or otherwise destroying the smooth, even wall surface of such metal part.

Still another object is for the provision in such a mounting for a knob or handle, an arrangement by which the attaching means is substantially concealed in the completed form of the mounting.

A still further object is to provide a knob or handle construction comprising a sheet metal connecting device which may be constructed independently of the sheet metal wall surface with which it is intended to be used, whereby it may be attached to such wall surface in any desired position to present means for engaging a threaded member in the mounting of knobs and handles formed of any different material such as hardened plastics, glass, wood, etc.

A more specific object aims to provide in such a knob or handle construction, a sheet metal connecting device including integral bolt receiving means deformed therefrom comprising elements adapted to engage a threaded member in the manner of a self-locking nut thereby enabling the positive, rigid attachment of knobs and handles by means of screws and bolts without the use of threaded nuts or lock washers of any kind.

Further objects and advantages of the invention will be apparent to those skilled in the art as a description thereof proceeds with reference to the accompanying drawing in which like reference characters designate like parts throughout the same and in which:

Fig. 1 is a side elevational view of an improved handle construction comprising a handle formed in one piece of any suitable material and represented partly in section to show the arrangement of the attaching means for mounting the handle to an imperforate sheet metal wall surface;

Fig. 2 is a perspective, on an enlarged scale, of one form of the connecting device per se shown embodied, more particularly, in the upper portion of the handle construction of Fig. 1;

Fig. 3 is a similar view of another form of connecting device and shown embodied in the lower portion of the handle construction of Fig. 1;

Fig. 4 is a side elevational view showing an alternate form of handle construction embodying a plurality of parts comprising individual spacers providing a rigid mounting of the handle on a decidedly irregular wall surface such as the dome of a teakettle;

Fig. 5 is a sectional view of a knob or handle mounting in which a hollow sheet metal knob is attached by means of a bolt passing through an opening provided therein to engage with the connecting device united with the imperforate sheet metal wall surface;

Fig. 6 is a sectional view of a similar mounting in which a conventional bolt fastening is united to the knob as by spot welding the same to the interior thereof such that the exterior surface of the knob is smooth and unbroken;

Fig. 7 is a vertical section through a mounting for a plastic knob in which the threaded member may be provided as by including an ordinary bolt fastening in the molding operation thereof; and, Fig. 8 is a vertical sectional view of a knob mounting comprising a threaded member provided integrally on a fastening having an enlarged head which cooperates with a separate spacer to form the complete knob mounting.

The handle and knob construction of the instant invention marks a decided advance in the art in that various attaching means may be provided which require only an inexpensive, one piece, sheet metal connecting strip without the use of threaded nut fastenings of any kind, and in which the knob, handle, or other object secured is mounted in a substantially fixed, rigid installation under continuously effective spring tension which not only compensates for strains and bending stresses set up in tightening of the mounting thereby minimizing any possibility of chipping or cracking of enameled surfaces, but also ensures a substantially locked fastening engagement of the securing bolt or screw with the complementary bolt receiving means provided in the connecting strip such that there is little likelihood of the mounting becoming loose by reason of frequent handling and unusual wear over long periods of use. To this end, the present invention contemplates the provision, in the connecting strip, of integral bolt receiving means comprising an element or elements struck and formed from the material of the connecting strip and otherwise suitably deformed therefrom to engage the securing bolt or screw in the manner of a nut. Thus, the use of conventional threaded nuts is entirely dispensed with and the connecting devices so provided have the distinct advantages of being light in weight and considerably cheaper in production, assembling operations and other items involved in the costs of manufacture. For example, in the manufacture of enameled sheet metal ware, such integral bolt receiving means in the connecting strip, being thin, sharp-edged and practically threadless, have no threads which may become clogged by the coating of enamel thus eliminating the necessity for threading the bolts thereinto prior to the application of the enamel as is necessary in knob and handle construction embodying conventional threaded nuts.

A further advantage of the use of such integral bolt receiving means provided in the sheet metal connecting strip, resides in the fact that the element or elements comprising the same may be so formed as to effect a substantial self-locking action with the bolt or screw securing the knob or handle in a completed mounting; and accordingly, since a self-locking fastening engagement is provided, there is no necessity for the use of lock washers, and the like, with the resultant savings not only in the cost of such devices themselves, but also the expense and labor involved in the tedious, time consuming assembling operations which they require.

Referring now in detail to the drawing, Fig. 1 shows a preferred embodiment of the invention directed to a handle construction for a cooking utensil or any similar sheet metal structure comprising a curved sheet metal wall designated generally A. The handle member 20 may comprise a one piece accessory provided from any suitable insulating material such as hardened plastic compositions, vulcanized fibre, hardwood, etc. and may be of any desired shape or configuration but preferably comprises in its design a curved body 21 including an arm 22 in its upper portion and an enlarged hub 23 in the lower portion thereof. The arm 22 being of comparatively small cross section is provided with a relatively small recess comprising a bore 24 provided for in the molding operation of the handle, or in any other suitable manner thereafter as by drilling. In communication with such bore is a bolt passage 25 merging into a countersink 26 seating the head of the bolt fastening 27, which otherwise extends through the bolt passage for securing engagement with the connecting device 30 united to the sheet metal wall A as hereinafter more fully set forth. Since a relatively small bore 24 must necessarily be provided in the arm 22 of small cross section, the compact substantially U-shaped connecting device 10, shown more particularly in Fig. 2, is employed most effectively. This form of connector requires only a minimum of space and is readily received and completely concealed in the relatively small bore 24 of arm 22 in the completed mounting of the handle.

Inasmuch as the lower portion of the handle comprises an enlarged hub 23, a relatively large, flared conical recess 24' may be provided together with a bolt passage 25' and a countersink 26' seating the head of the bolt fastening 28. The bolt fastening extends into the recess 24' for securing engagement with an alternate form of connecting device 15, comprising a substantially S-shaped fastening which is readily received in assembled relation with the flared conical recess 24' in the completed mounting of the handle.

As shown in Fig. 2, the substantially U-shaped connecting device 10 may be most economically constructed in one piece from a simple, inexpensive, T-shaped section of sheet metal to provide a fastening comprising an inturned flange 11, at one end, an intermediate web 12, and an elongated head 13 extending in the same general direction of the flange and provided with integral bolt receiving means of any suitable or desired character, but preferably comprising cooperating tongues 14 struck and formed lengthwise of the said elongated head section 13. Thus, the connecting device may be formed from a minimum of material with an adequate, suitable section for providing bolt receiving means comprising co-operating tongues which are much more desirable than any similar bolt receiving means because of the greater general utility and practicability thereof and the unusual strength afforded thereby. The connecting device thus provided is therefore most simple and inexpensive and by reason of its U-shaped construction requires only a minimum of space such that it is especially suited for use in installations calling for compact, small fastenings such as, for example, the cylindrical bore arrangement 24, Fig. 1, in the upper portion of the handle construction shown.

In Fig. 3 there is shown, more particularly, the alternate form of connecting device 15, which is more conveniently employed in installations having parts of such size as will permit the provision of enlarged recesses, such as, for example, the flared conical recess 24' provided in the enlarged hub 23 comprising the lower portion of the handle construction of Fig. 1. This form of connecting device is most advantageous in that it may be provided at extremely low cost from very small sections of strip stock of uniform width in a simple stamping and forming operation involving no waste of material whatsoever. In providing this form of the connecting device, the section of strip material is suitably bent into a substantial S-shape comprising a flange 16 at one end, an intermediate web 17, and a head portion 18 including integral bolt receiving means in the form of cooperating tongues 14 formed lengthwise of said head section.

Such integral bolt receiving means may, of course, be provided in various other forms and it is therefore to be understood that in any of the several embodiments of the present invention directed to the general combination in a knob or handle construction, the disclosure is not limited to the specific bolt receiving means comprising cooperating tongues. However, it has been found that such bolt receiving means prepared in the form of cooperating tongues, as shown, are the most efficient and most practical in that they are possessed of unusual inherent strength and accordingly, will not collapse or pull through on tightening of the bolt nor loosen from fastening engagement under frequent handling of the completed article and over long periods of use. This is possible by reason of the fact that such tongues tend, more effectively, to move toward each other and dig into the grooves intermediate adjacent threads on tightening of the bolt or screw and thereby become embedded in the root diameter of such threaded member in locked frictional fastening engagement therewith such that any vibration, jarring or strain taking place in the completed mounting cannot cause displacement, reverse rotation or tend toward unscrewing of the bolt from applied fastening position. Thus, it will be understood that in the provision of such integral bolt receiving means in the connecting devices employed in the handle or knob constructions of the instant invention, the use of individual threaded nuts or lock washers of any kind is entirely dispensed with thereby providing not only a considerable saving in the cost of such nuts and lock washers, but also materially reducing the expense and labor incident to the tedious, time-consuming assembling operations which such fastenings require.

With the several parts of the handle construction provided as aforesaid, the mounting of the handle on the sheet metal wall of a percolator, coffee pot, cooking vessel, or in fact, any sheet metal wall surface, is accomplished in substantially the following manner. The connecting devices 10, 15 are united to the sheet metal wall A at predetermined spaced points by spot welding the base flanges 11, 16 thereof to the wall surface as designated generally W, W'. The spacing of the connecting devices on the wall member is such that the respective bolt receiving means 14 in the head members 13, 18, thereof are disposed such a distance apart as to correspond substantially with the spacing of the bolt passages 25, 25', provided in the handle and thereby in substantial alignment therewith. By this arrangement the connecting devices are also so disposed as to be readily received in their respective recesses 24, 24' provided in the arm 22 and hub 23 of the handle. After such spot welding operation to unite the connecting devices to the sheet metal wall, in the event the completed article is to have an enamel finish, the assembly described may be enameled in any desired number of coats without, in any way, affecting the operativeness of the bolt receiving means 14 in receiving the securing bolts 27, 28 in the subsequent mounting of the handle. In this respect, a most decided advantage is obtained in the use of the connecting devices of the instant invention over any heretofore known arrangement embodying conventional threaded nuts. In the use of conventional threaded nuts, it is necessary first to assemble the bolt in the nut to protect the threads of the same from being clogged with enamel during the enamelling operation, thereafter remove the bolt in assembling the knob or handle on the sheet metal part, and then, again apply the bolt to the nut in attaching the handle to complete the mounting. In the use of the connecting devices disclosed herein, the bolt receiving means provided are necessarily thin, sharp edged and practically threadless and thus have no threads which may become clogged by the application of any number of coatings of enamel; thus, there is no necessity for the separate operation of inserting the bolt into the bolt receiving means to protect the same during the enamelling operation, wherefor the handle or knob may be applied to assembled relation with the spaced connecting devices immediately after any such enamelling and the bolt fastenings readily threaded to locked fastening engagement with the bolt receiving means in completing the mounting.

As shown in Fig. 1, in completing the handle mounting, the handle is applied to the sheet metal wall surface A in assembled relation with the previously attached connecting devices which are fully received in the recesses 24, 24' to be completely concealed, thereby adding to the effectiveness of the appearance and design of the handle mounting. The bolts 27, 28 are then applied through the countersinks 26, 26', and bolt passages 25, 25', to engage with the bolt receiving means 14 provided in the head members 13, 18, of the respective connecting devices. After the securing bolts have been tightened to substantially locked fastening engagement, if desired, the countersink 26, 26' may be employed for receiving plugs, buttons, or any other suitable finishing object to conceal the heads of the bolts and otherwise enhance the general appearance of the handle construction.

In tightening the securing bolts to provide a fixed, rigid mounting of the handle on the sheet metal wall member A, it will be noted that the extremities of the arm 22 and the hub 23 bear directly upon the wall member, and, in the event the wall member A had been enameled, this, of course, would appear objectionable since cracking and chipping of the enamel could possibly result incident to bending stresses set up on tightening of the securing bolts. However, inasmuch as the connecting devices are constructed of sheet metal, they are necessarily yieldable not only in the head sections but also in the area of the integral bolt receiving means thereof; thus, on tightening of the securing bolts the bolt receiving means may give and yield relative to the enameled wall surface to compensate for any bending stresses which might be set up. Accordingly, it may be readily understood that in the instant handle construction embodying such sheet metal connecting devices, a further most important advantage is obtained in that, on tightening the securing bolts to complete the handle mounting, very little bending stress, if any, is communicated to the enameled wall member wherefor possibility of chipping, cracking or breaking of the enamel is greatly minimized and in many installations completely eliminated.

From the foregoing, it will be readily appreciated that the handle or knob constructions of the instant invention mark a decided advance in the art in a number of most outstanding respects and that the numerous advantages obtained are the result of the incorporation, in the general combination of parts comprising a knob or handle construction, of the simple, inexpensive, most efficient and practical sheet metal connecting devices. And in this respect, it will be quite obvious to those skilled in the art that such sheet metal connecting devices may be provided in numerous modified forms without departing from the teachings of this invention directed to the general combination of a handle or knob construction. It will also be appreciated that the invention is equally applicable in any other installation embodying a sheet metal wall surface or panel which comprises an integral part of an assembly such as sheet metal cabinets, and door or drawer constructions employed in refrigerators, gas or electric ranges and the like.

Fig. 4 shows a further embodiment of the invention directed to a handle mounting on a decidedly irregular wall surface such as the dome of a tea kettle. In order that the handle 30 having a fixed, rigid mounting and due provision made for the irregularities of the wall surface to which it is attached, individual cup-shaped spacers 31 are provided which, of course, may be suitably designed to have a firm, snug, close engagement with any selected area of the irregular wall surface in the completed mounting of the handle.

Such spacers are readily formed of plastic or any other suitable material and are preferably of such size as to permit the provision of an enlarged, flared recess 32 capable of receiving the inexpensive, strip type of connecting devices 15, shown more particularly in Fig. 3. Thus, as shown, the connecting devices are united to the dome of the tea kettle or other irregular sheet metal wall surface A as by spot welding W, W', substantially in the manner set forth with respect to the handle construction of Fig. 1. The spacers 31 are then applied to the connecting devices which are fully received therein and otherwise completely concealed to provide a rigid, compact arrangement in which there are no unsightly fastenings exposed to detract from the appearance of the completed handle construction.

The handle 30 itself is preferably a one piece accessory which may be formed of plastic material and of such a color as to contrast with that of the spacers. At suitable spaced points, the handle is provided with bolt passages 34 in substantial alignment with bores 32 in the spacers whereby securing bolts 35 may be applied to the assembly to engage with the integral bolt receiving means 14 in the head members 18 of the connecting devices in completing the mounting of the handle.

Figs. 5-8 inclusive disclose various knob constructions embodying either of the connecting devices of Figs. 2 and 3 and otherwise mounted substantially in the manner described with reference to the handle constructions of Figs. 1 and 4. Thus, Fig. 5 shows a knob construction comprising a one-piece, sheet metal, hollow knob or handle 40 so designed as to fully receive and completely conceal the connecting means 15 united to the sheet metal wall A by spot welding W. The head of the knob is provided with an opening 41 through which a bolt fastening 42 may be applied to engage with the bolt receiving means 14 in the connecting device in securing the knob in mounted position on the sheet metal wall surface. In this respect, in order to provide for a fixed, rigid mounting of the knob at all times, the wall surface may be provided with an embossment A' which coengages in the flared open end of the knob to prevent shifting or loosening of the knob from its initially mounted position.

In Fig. 6 a modified form of knob mounting is shown in which all of the fastening means including the head of the securing bolt may be completely concealed from view in the completed form of the mounting. Thus, a hollow, sheet metal knob 50 is provided and the bolt fastening 51, which may be any conventional form of stove bolt or wood screw, is rigidly attached to the interior of the knob as by spot welding W3. The knob may then be attached to the sheet metal wall surface by rotating the same to engage the shank of the bolt fastening with the bolt receiving means 14 of the connecting device 10 previously united to the sheet metal wall surface in the usual manner as by spot welding W.

In Fig. 7 a still further modification is illustrated in which the knob 60 may comprise a plastic composition material molded to the desired shape and configuration together with a common bolt fastening 61 and provided with a suitable bore 62 for receiving the connecting device 10 in assembled relation therewith. With the connecting device united to the sheet metal wall surface by spot welding in the manner described, such a knob may be easily and quickly attached simply by fitting the bore 62 thereof to the connecting device and rotating the same such that the shank of the bolt fastening enters into threaded engagement with the integral bolt receiving means 14 of the connecting device.

In Fig. 8, still another knob construction is shown in which a bolt fastening 70, including an integral, enlarged head 71 is employed with an individual spacer 73 housing the connecting device 10 united to the sheet metal wall A as by spot welding W, in the usual manner. The head 71 of the bolt fastening may comprise a hub portion 72 snugly fitting the outer, open end of the hollow spacer whereby the said head 71 and spacer 73 have no relative movement in assembled relation and together present a fixed, rigid knob construction in which all of the fastening means are entirely concealed from view in the completed mounting which is obtained by rotating the bolt fastening 70 into threaded engagement with the integral bolt receiving means 14 of the connecting device.

Although in the foregoing description and the accompanying drawing, the disclosure is directed to a number of embodiments in both knob and handle constructions, it is obvious that the invention is applicable wherever an operating member or gripping element is to be mounted on a sheet metal wall surface. Accordingly, it will be understood that the disclosure is not to be limited to any strict interpretation of the word "handle" as used in the accompanying claims but should be considered as also defining knobs, gripping devices, drawer pulls, and the like.

And while the invention has been described in detail with specific examples, such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A mounting for attaching a handle, knob, or the like, to a sheet metal wall comprising, a substantially U-shaped, sheet metal connecting device having a flange section at one end welded to the surface of the sheet metal wall and a yieldable head section extending free at the opposite end thereof, said head section comprising integral bolt receiving means deformed therefrom adapted to engage a threaded member in the manner of a nut, said threaded member securing the knob or handle to the sheet metal wall in a resilient connection provided by said yieldable head section of the connecting device, said handle or knob comprising a recessed body portion housing the connecting device and substantially concealing the same in the completed form of the mounting.

2. A mounting for attaching a handle, knob, or the like, to a sheet metal wall comprising, a substantially S-shaped, sheet metal connecting device having a flange section welded to the surface of the sheet metal wall and a head section extending free at the opposite end thereof adapted to yield relative to said wall surface, said head section comprising integral bolt receiving means deformed therefrom adapted to engage a threaded member in the manner of a nut for securing the knob or handle to the sheet metal wall in a resilient connection provided by said yieldable head section of the connecting device, said handle or knob having a recessed body portion housing the connecting device to substantially conceal the same in the completed form of the mounting.

3. A mounting for attaching an article to a wall member under continuously effective spring tension, said mounting comprising a unitary connecting device having a section welded to the wall member and including a head section spaced from said wall member and extending free to be yieldable relative thereto, said head section being provided with threaded fastener receiving means adapted to engage a threaded member securing the article to the wall member in a resilient connection provided by said yieldable head section of the connecting device.

4. A mounting for attaching an article to a wall under continuously effective spring tension, said mounting comprising a unitary sheet metal connecting device having a section united to the wall and including a head section spaced from said wall and extending free to be yieldable relative thereto, said head section being provided with threaded fastener receiving means adapted to engage a threaded fastening member in the manner of a nut for securing the article to the sheet metal wall in a resilient connection provided by said yieldable head section of the connecting device.

5. A mounting for attaching an article to a sheet metal wall under continuously effective spring tension, said mounting comprising a sheet metal connecting device having a section united to the sheet metal wall and including a head section spaced from said wall and extending free to be yieldable relative thereto, said head section being provided with threaded fastener receiving means adapted to engage a threaded member securing the article to the sheet metal wall in a resilient connection provided by said yieldable head section of the connecting device, said article comprising a recessed body portion housing the connecting device to substantially conceal the same in the completed form of the mounting.

6. A mounting for attaching an article to a sheet metal wall under continuously effective spring tension, said mounting comprising a sheet metal connecting device having a flange section welded to the surface of the sheet metal wall and including an intermediate web carrying a head section spaced from said wall and extending free to be yieldable relative thereto, said head section comprising integral bolt engaging means provided therein adapted to engage a threaded member securing the article to the sheet metal wall in a resilient connection provided by said yieldable head section of the connecting device.

7. A mounting for attaching an article to a sheet metal wall under continuously effective spring tension, said mounting comprising a sheet metal connecting device having a flange section welded to the surface of the sheet metal wall and including a head section spaced from said wall and extending free to be yieldable relative thereto, said head section comprising integral bolt engaging means provided therein adapted to engage a threaded member in the manner of a nut for securing the article to the sheet metal wall in a resilient connection provided by said yieldable head section of the connecting device, said article comprising a recessed body portion housing the connecting device to substantially conceal the same in the completed form of the mounting.

8. A mounting for attaching an article to a sheet metal wall under continuously effective spring tension, said mounting comprising a sheet metal connecting device having a flange section united to the surface of the sheet metal wall and including an intermediate web carrying a head section spaced from said wall and extending free to be yieldable relative thereto, said head section comprising integral bolt engaging means provided therein adapted to engage a threaded member in the manner of a nut for securing the article to the sheet metal wall in a resilient connection provided by said yieldable head section of the connecting device, said article comprising a recessed body portion housing the connecting device to substantially conceal the same in the completed form of the mounting.

9. A mounting for attaching a handle or the like to a sheet metal member, said mounting comprising a sheet metal connecting device having a flange section united to said sheet metal member and a head section spaced therefrom and extending free to be yieldable relative to said sheet metal member, said head section being provided with bolt receiving means for engaging a threaded fastener securing the handle to the sheet metal wall member in a resilient connection provided by said yieldable head section, said handle comprising a recessed body portion in the form of a separate spacer element housing the connecting device to substantially conceal the same in the completed form of the mounting.

GEORGE A. TINNERMAN.